Sept. 19, 1967 A. S. HART 3,343,152
BATTERY LEVEL INDICATOR
Filed Jan. 21, 1966
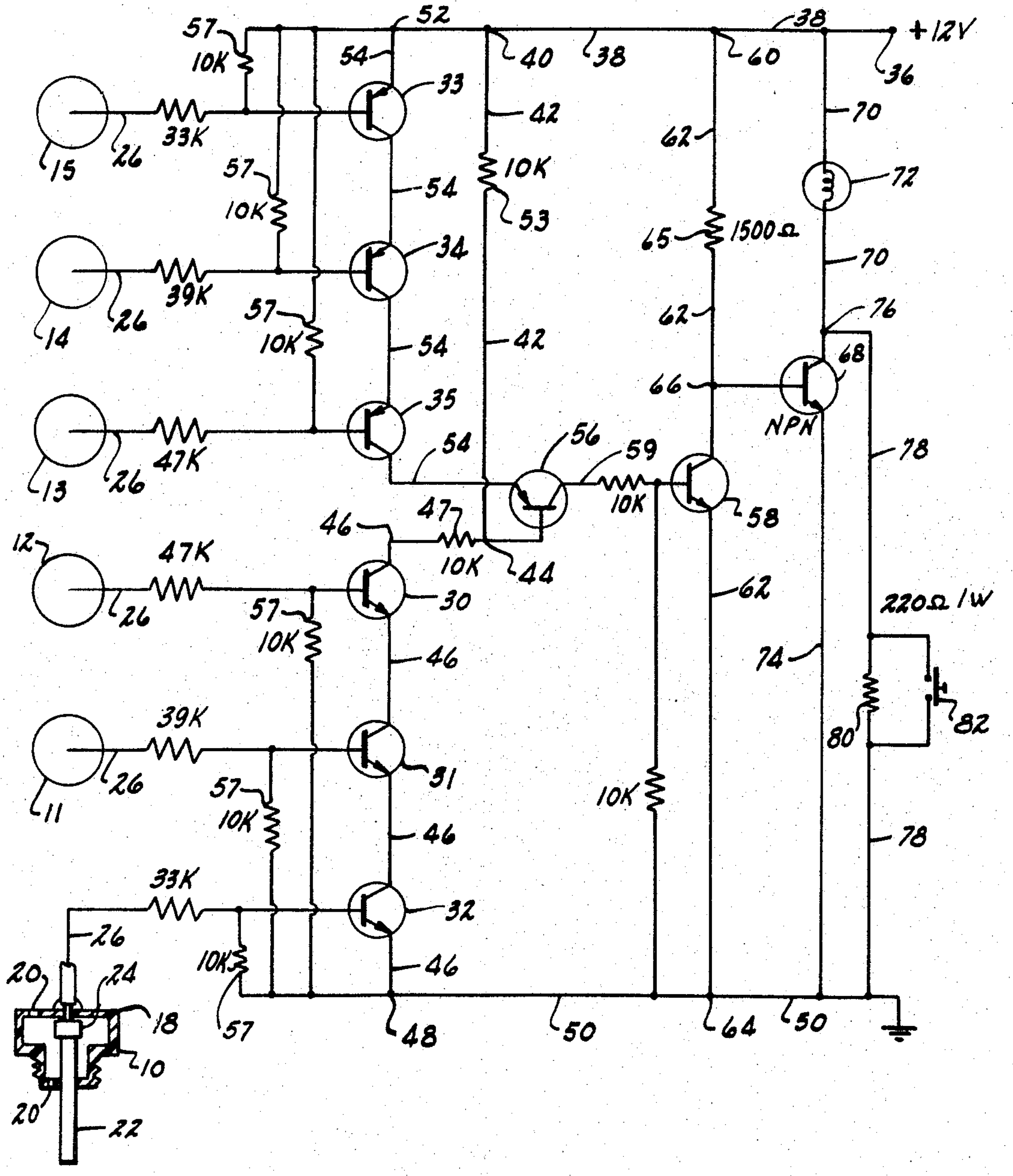
INVENTOR.
ATLEE S. HART
BY
TENNES I. ERSTAD
JOHN E. McRAE
ATTORNEYS 3,343,152
Patented Sept. 19, 1967

3,343,152

BATTERY LEVEL INDICATOR

Atlee S. Hart, Oak Park, Mich., assignor to American Radiator & Standard Sanitary Corporation, New York, N.Y., a corporation of Delaware Filed Jan. 21, 1966, Ser. No. 522,202
4 Claims. (Cl. 340—249)

This invention relates to a liquid level indicator for wet cell batteries, especially auto and truck batteries.

Objects of the invention are to provide battery electrolyte level indicator means which is relatively low in cost and satisfactory in service.

The single figure in the drawing shows a circuit diagram for a solid state level indicator constructed according to the invention.

In the drawing there are shown six filler caps, numbered 10 through 15, each cap being associated with one cell of a six-cell battery. Cap 10 is shown in cross section, while the remaining caps are shown diagrammatically. Each cap includes an externally threaded plastic cap member 18 having vent openings 20 and a depending probe 22, preferably formed of carbon to avoid chemical reaction with the cell electrolyte. Each probe has a press fit in a metal thimble 24 which is soldered to a lead wire 26. The various lead wires may have their other ends connected to the bases of individual transistors numbered 30 through 35 in the drawings. It will be understood that probes 22 are of sufficient length to terminate just below the lowest safe operating electrolyte level when the individual caps 18 are screwed into the battery fill openings.

Transistors 33, 34 and 35 are PNP transistors having their emitter-collector circuits arranged in a circuit which incudes terminal 36, line 38, junction 52, line 54 and the emitter of a signal transistor 56. Resistance 47 limits the current in lines 54 and 46. Transistors 30, 31 and 32 are NPN transistors having their collector-emitter circuits arranged in a circuit traced from the base of transistor 56 through line 46, junction 48, and line 50 to ground. When all electrolyte probes are conducting transistor 56 is in condition to transmit an output signal from line 54 through line 59 to the base of an amplifier transistor 58.

Transistors may have leakage currents across the emitter-collector circuits when in the nominally non-conducting mode. Such leakage currents can be prevented by reverse biasing the transistor. The various lines containing resistors 57 serve to reverse bias transistors 30 through 35. Line 42 containing resistance 53 serves to reverse bias transistor 56.

The collector and emitter of transistor 58 are connected in a circuit which includes terminal 36, line 38, junction 60, line 62, junction 64, and ground line 50. Grounded emitter transistor 58 thus normally conducts an amplified signal through line 62, and resistance 65 in line 62 causes junction 66 to be substantially at ground potential. Therefore the final transistor 68 is normally held off.

The output for transistor 68 includes a line 70 containing a small warning lamp 72 therein, and a grounded line 74. When each of the battery cells has an adequate liquid level this transistor is in the non-conducting mode, and the lamp has no visible light output. The lamp may however advantageously draw a small current through a circuit which comprises line 70, junction 76, line 78 and resistance 80. Resistance 80 is chosen to limit the lamp current below a noticeable light output level; its purpose is to heat the lamp slightly while transistor 68 is non-conducting so that when the transistor suddenly becomes conducting it will not be damaged by a surge of current flowing through the lamp. A normally open manual switch 82 may be provided for testing the integrity of lamp 72. The lamp will of course be located in an easily viewed area, as on the dashboard of a vehicle in which the battery is used.

The six transistors 30 through 35 are arranged with transistor 30 connected to the most positive electrolyte and the succeeding transistors connected to progressively negative cells. Thus the cell for transistor 30 is most positive, and the cell for transistor 35 is most negative. When all cells are above safe liquid levels each transistor 30 through 35 is in the conducting mode, and transistor 56 is operable to conduct a signal through line 59 to the base of transistor 58. Transistor 58 conducts to cause junction 66 to be at substantially ground potential, thus holding transistor 68 in the off mode.

When any of the cells for transistors 30, 31 or 32 has an abnormally low liquid level the circuit through line 46 is broken, thus raising the base potential for transistor 56 to approximately that of the source 36. The transistor thus goes non-conducting, turning off transistor 58 and raising the potential at junction 66. Transistor 68 is thus turned on to provide full lamp illumination through the collector-emitter circuit connected to line 74.

When any of the cells for transistors 33, 34 or 35 has an abnormally low liquid level the circuit through line 54 is broken, thus eliminating the emitter current for transistor 56. The two transistors 56 and 58 thus are turned off, and transistor 68 turned on to illuminate the lamp.

I claim:

1. Liquid level indicator means for a multi-cell battery comprising an electrically conductive probe for each cell, each probe terminating within the cell approximately at the lowest safe operating electrolyte level; said probes being divided into first and second groups, the first group being associated with electrolyte which is more negative than that of the second group; a source of positive voltage; a first group of PNP transistors having their respective bases connected to respective probes in the first group, and their emitter-collector circuits in a series circuit initiating at the source of positive voltage; a signal transistor having its emitter-collector circuit connected with the aforementioned series circuit; a second group of NPN transistors having their respective bases connected to respective probes in the second group, and their collector-emitter circuits in a second normally grounded series circuit initiating at the base connection of the signal transistor.

2. The indicator means of claim 1 and further comprising an NPN transistor amplifier; a connection between the collector of the signal transistor and the base of the transistor amplifier; a circuit line between the source of positive voltage and the collector of the transistor amplifier; a resistance in said circuit line; a connection between the emitter of the transistor amplifier and ground; a current-energized warning device and energizer transistor therefor; said warning device and the collector-emitter circuit of the energizer transistor being located in a groundable circuit initiating at the source of positive voltage;

the base of said energizer transistor being connected to the aforementioned circuit line at a point between the resistance and the transistor amplifier collector.

3. The indicator means of claim 2 wherein the warning device takes the form of an indicator lamp; the combination further comprising a second resistance connected between the lamp and ground; said second resistance having a value such that when the energizer transistor collector-emitter circuit is open the lamp will draw current sufficient to heat the lamp but insufficient to produce noticeable lamp illumination.

4. The indicator means of claim 3 and further comprising a lamp testing circuit between the lamp and ground, said testing circuit including a manually closable switch.

No references cited.

NEIL C. READ, *Primary Examiner.*

D. MYER, *Assistant Examiner.*